US010802874B1

(12) United States Patent
Palsule et al.

(10) Patent No.: US 10,802,874 B1
(45) Date of Patent: Oct. 13, 2020

(54) CLOUD AGNOSTIC TASK SCHEDULER

(71) Applicant: VMware, Inc., Palo Alto, CA (US)

(72) Inventors: Anurag Palsule, Bangalore (IN);
Srinivas Surishetty, Bangalore (IN);
Ishant Tyagi, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/142,805

(22) Filed: Sep. 26, 2018

(51) Int. Cl.
G06F 9/46 (2006.01)
G06F 9/48 (2006.01)
G06F 9/54 (2006.01)
H04L 29/08 (2006.01)
G06F 9/455 (2018.01)
G06F 9/50 (2006.01)

(52) U.S. Cl.
CPC ........ G06F 9/4881 (2013.01); G06F 9/45558 (2013.01); G06F 9/5038 (2013.01); G06F 9/5077 (2013.01); G06F 9/54 (2013.01); H04L 67/32 (2013.01); G06F 2009/4557 (2013.01)

(58) Field of Classification Search
CPC .................................................... G06F 9/4881
USPC .......................................................... 718/102
See application file for complete search history.

(56) References Cited

U.S. PATENT DOCUMENTS

| | | | | |
|---|---|---|---|---|
| 6,606,585 B1 * | 8/2003 | Borowsky | ........... | G06F 11/3452 702/15 |
| 8,606,925 B2 * | 12/2013 | Bailey | ................... | H04L 41/084 709/226 |
| 8,683,479 B1 * | 3/2014 | Arlitt | ................... | G06F 9/5088 709/223 |
| 9,483,286 B2 * | 11/2016 | Basavaiah | ........... | H04L 67/1002 |
| 2006/0165116 A1 * | 7/2006 | Bayus | ................... | H04L 41/082 370/463 |
| 2010/0205416 A1 * | 8/2010 | Lanner | ................ | G06F 9/44505 713/1 |
| 2010/0299675 A1 * | 11/2010 | Yuyitung | ............ | G06F 11/3447 718/105 |
| 2011/0145830 A1 * | 6/2011 | Yamaguchi | ........... | G06F 9/5027 718/104 |
| 2011/0302578 A1 * | 12/2011 | Isci | ........................ | G06F 9/5077 718/1 |
| 2012/0151480 A1 * | 6/2012 | Diehl | ....................... | G06F 9/461 718/1 |
| 2012/0159471 A1 * | 6/2012 | de Souza | .................. | G06F 8/61 717/178 |
| 2012/0239376 A1 * | 9/2012 | Kraft | ................... | G06F 9/45533 703/22 |

(Continued)

Primary Examiner — Mehran Kamran
(74) Attorney, Agent, or Firm — Adeli LLP

(57) ABSTRACT

Cloud agnostic task scheduling is disclosed. In an embodiment, a method includes receiving a configuration request for configuring a virtual service in a cloud environment. In response to a pre-specified event, one or more objects that are operated on by the configuration request is identified. The method determines whether the request can be processed based at least in part on a list of pending tasks. In response to a determination that the request can be processed, the method derives one or more end states for the one or more objects that are identified. The method converts the request to a set of one or more tasks operating on the one or more objects, identifies tasks in the list of pending tasks that are combinable, combines the identified tasks into a combined task that would result in the one or more end states, and sends the combined task to be executed.

20 Claims, 5 Drawing Sheets

(56) References Cited

U.S. PATENT DOCUMENTS

| | | | |
|---|---|---|---|
| 2013/0036425 A1* | 2/2013 | Zimmermann | G06F 9/4881 718/106 |
| 2013/0117422 A1* | 5/2013 | Nelson | G06F 9/5072 709/221 |
| 2013/0339560 A1* | 12/2013 | Aoshima | G06F 9/526 710/200 |
| 2013/0346992 A1* | 12/2013 | Sonoyama | G06F 9/46 718/102 |
| 2014/0244791 A1* | 8/2014 | Fellows | H04L 67/06 709/217 |
| 2014/0304712 A1* | 10/2014 | Kim | G06F 9/5088 718/105 |
| 2015/0347194 A1* | 12/2015 | Che | G06F 9/5077 718/1 |
| 2016/0182284 A1* | 6/2016 | Ayanam | H04L 41/0806 709/222 |
| 2016/0203031 A1* | 7/2016 | Chai | G06F 15/00 718/104 |
| 2016/0307141 A1* | 10/2016 | Wu | G06Q 10/06398 |
| 2016/0342335 A1* | 11/2016 | Dey | G06F 3/0607 |
| 2016/0378554 A1* | 12/2016 | Gummaraju | G06F 9/5011 718/104 |
| 2016/0378568 A1* | 12/2016 | Knox | G06F 9/5083 718/105 |
| 2018/0101395 A1* | 4/2018 | Aleksandrov | G06F 9/45558 |
| 2018/0150511 A1* | 5/2018 | Chen | G06F 16/27 |
| 2018/0157568 A1* | 6/2018 | Wagner | G06F 9/45516 |
| 2018/0332138 A1* | 11/2018 | Liu | H04L 41/5041 |
| 2019/0097969 A1* | 3/2019 | Voss | H04L 61/3025 |

\* cited by examiner

Request (R1): objectID 3
Task T6: Configure params
Task T7: Add IP1 to NIC 1

Request (R2): objectID 3
Task T8: Configure params
Task T9: Add IP2 to NIC 1

Request (R3): objectID 3
Task T10: Configure params
Task T11: Remove IP1 from NIC1

Request (R4): objectID 3
Task T12: Configure params
Task T13: Remove IP2 from NIC1

Request (R5): objectID 3
Task T14: Configure params
Task T15: Delete NIC1

Timeline:
1. R1 arrives
2. Execute R1 because it can be processed
3. Execute T6 and T7
4. R2-R5 arrive while (3) is in progress; R2-R5 cannot be processed
5. R1 completes execution
6. Execute T8-T11

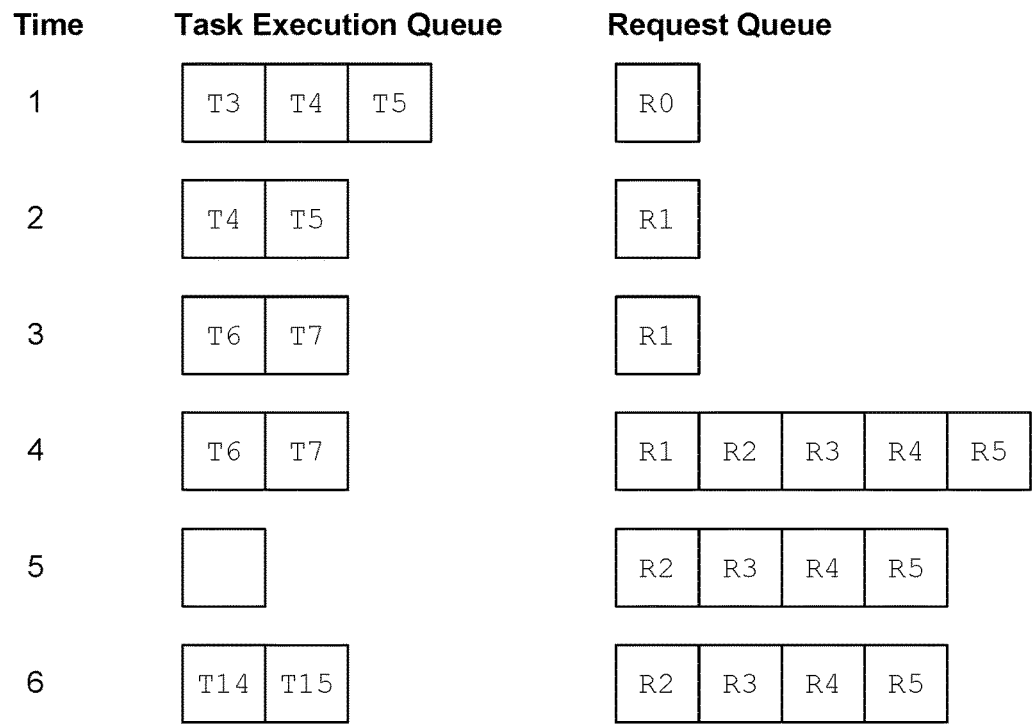

CLOUD AGNOSTIC TASK SCHEDULER

BACKGROUND OF THE INVENTION

Computer systems such as data centers generally interact with a cloud via API requests. For example, a data center may manage network traffic and integrate with a public cloud based on requests such as storing or retrieving information from the public cloud. As another example, a web server can be set up by sending commands to the public cloud. Typically, API requests are serviced one at a time to ensure a proper ordering of commands. However, servicing API requests sequentially, one at a time, or in similar manners can be slow, inefficient, and even cause timeouts. Conventional techniques are not easily scalable and do not readily accommodate a large number of services. Thus, a more efficient technique for servicing API requests while preserving the order of execution for commands is needed.

BRIEF DESCRIPTION OF THE DRAWINGS

Various embodiments of the invention are disclosed in the following detailed description and the accompanying drawings.

FIG. 5 shows an example of request processing by a cloud agnostic task scheduler according to some embodiments.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A cloud agnostic task scheduler is disclosed. The scheduler improves request processing by batching requests and scheduling requests to be serviced by a cloud. The scheduler can be provided in (integrated with) a datacenter such as a distributed network system further described with respect to FIG. 1. The techniques described here maintain concurrency while improving efficiency of request handling by determining if or when a request can be processed, combining one or more tasks associated with the request (tasks can be combined for example due to an end state, operating on the same object such as a virtual machine, etc.), and sending a single combined task to be executed by a cloud.

Figure 1:
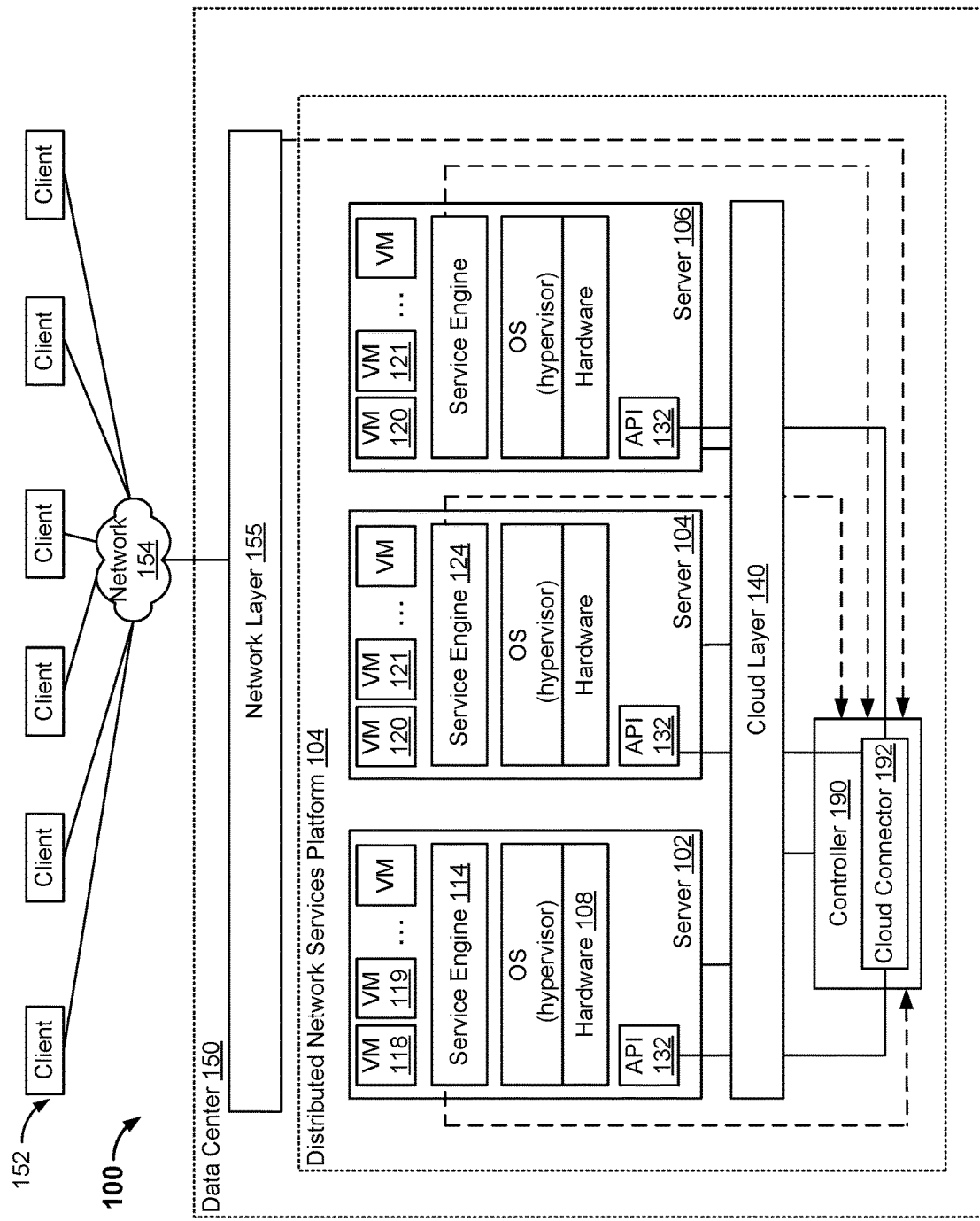
FIG. 1 is a block diagram illustrating an embodiment of a distributed network system.
Figure 2:
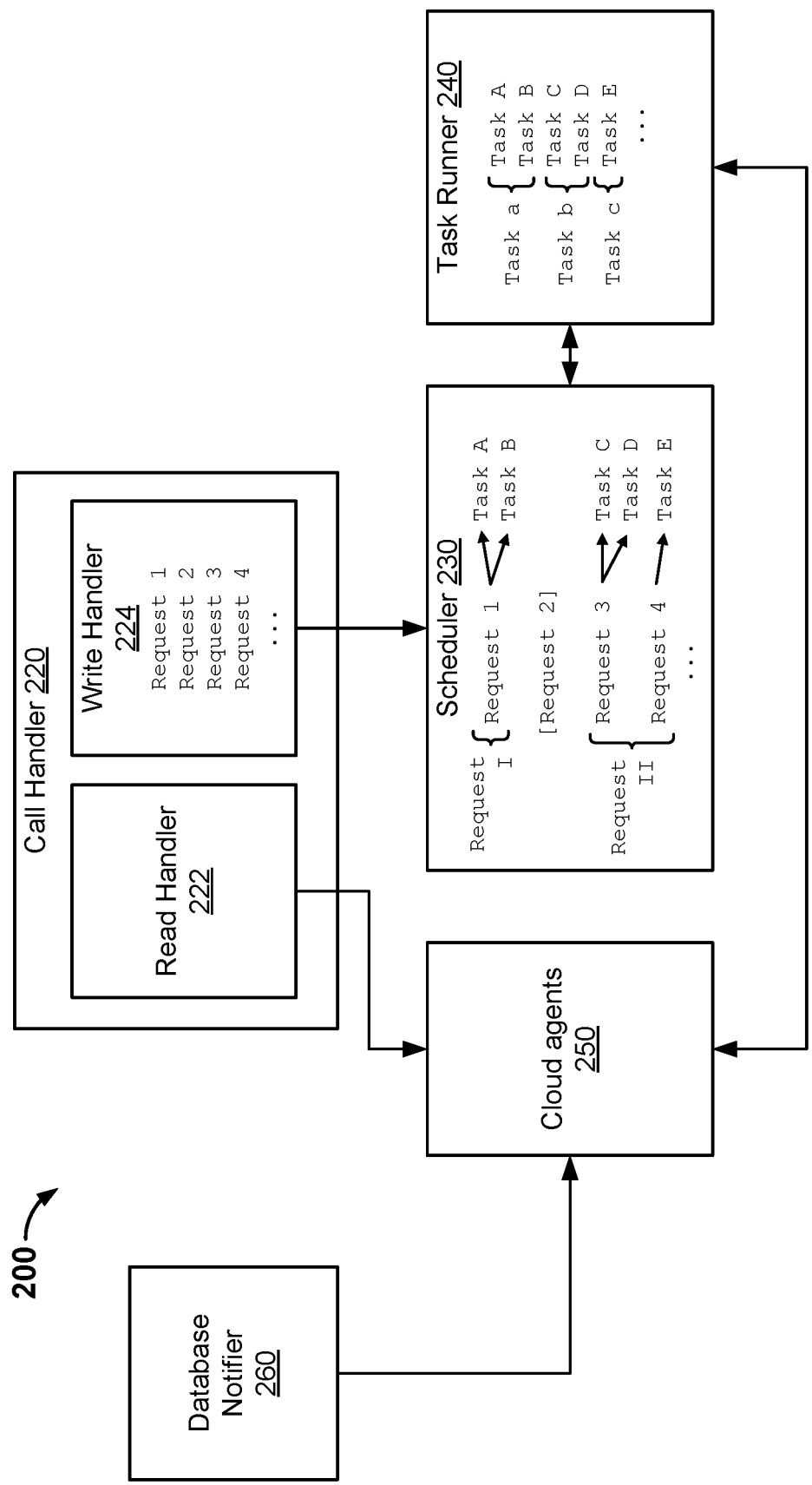
FIG. 2 is a block diagram illustrating an embodiment of a system for cloud agnostic task scheduling.
Figure 4:
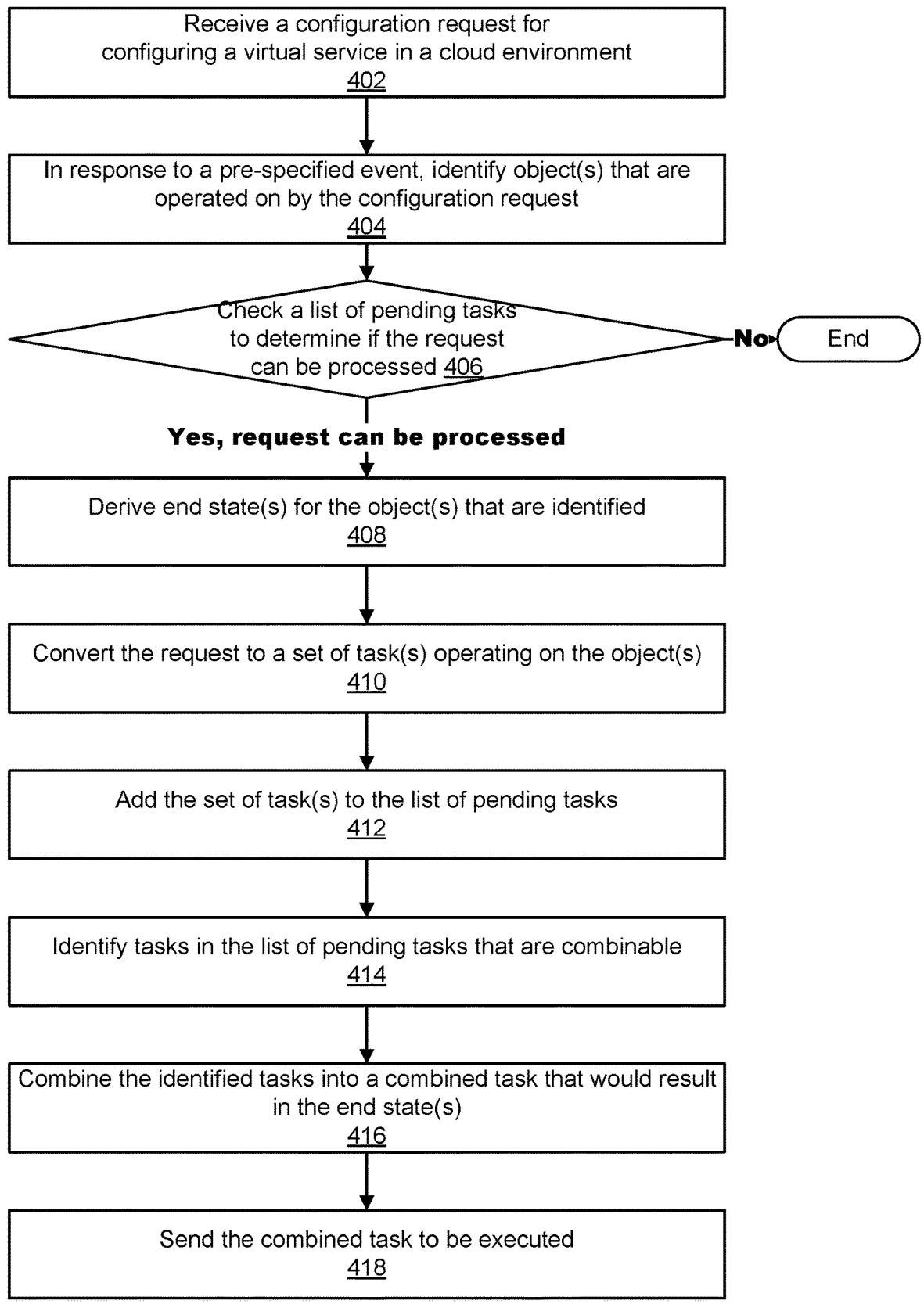
FIG. 4 is a flow chart illustrating an embodiment of a process for cloud agnostic task scheduling.

In various embodiments, a process for cloud agnostic task scheduling includes receiving a configuration request for configuring a virtual service in a cloud environment, and identifying one or more objects that are operated on by the configuration request in response to a pre-specified event (such as completion of execution of request(s) or receiving a new request). The process determines that the request can be processed based on (possibly among other things) a list of pending tasks. If the request can be processed, one or more end states are derived for the identified object(s). The process converts the request to a set of one or more tasks operating on the object(s). Tasks that are combinable in the list of pending tasks are identified, and combined into a combined task that would result in the end state(s). The process then sends the combined tasks to be executed. FIGS. 1 and 2 show a system implementing this process. FIG. 4 describes the process in greater detail. FIG. 5 is an example of request processing using this process.

FIG. 1 is a block diagram illustrating an embodiment of a distributed network system. The cloud agnostic task scheduling techniques described here can be applied to a distributed network system such as the one shown here.

In this example, client devices such as 152 connect to a data center 150 via a network 154. A client device can be a laptop computer, a desktop computer, a tablet, a mobile device, a smart phone, a wearable networking device, or any other appropriate computing device. In some embodiments, the client is implemented on a system such as 300. In some embodiments, a web browser and/or a standalone client application is installed at each client, enabling a user to use the client device to access certain server applications (also referred to as virtual services because they simulate the behavior of a traditional service without needing the components associated with a traditional service to be implemented) hosted by data center 150. Network 154 can be the Internet, a private network, a hybrid network, or any other communications network.

In the example shown, a network layer 155 comprising networking devices such as routers, switches, etc. forwards requests from client devices 152 to a distributed network service platform 104. In this example, distributed network service platform 104 includes a number of servers configured to provide a distributed network service. The servers may reside in a (private or public) cloud. Examples of servers include Amazon AWS®, Google Cloud®, Microsoft Azure®, and VMWare®. A physical server (e.g., 102, 104, 106, etc.) has hardware components and software components. In this example, hardware (e.g., 108) of the server supports operating system software in which a number of virtual machines (VMs) (e.g., 118, 119, 120, 121, etc.) are configured to execute.

A VM is a software implementation of a machine (e.g., a computer) that simulates the way a physical machine executes programs. The part of the server's operating system that manages the VMs is referred to as the hypervisor. The hypervisor interfaces between the physical hardware and the VMs, providing a layer of abstraction to the VMs. Through its management of the VMs' sharing of the physical hardware resources, the hypervisor makes it appear as though each VM were running on its own dedicated hardware. Examples of hypervisors include the VMware Workstation® and Oracle VM VirtualBox®. Although physical servers supporting VM architecture are shown and discussed extensively for purposes of example, physical servers supporting other architectures such as container-based architecture (e.g., Kubernetes®, Docker®, Mesos®), standard operating systems, etc., can also be used and techniques described herein are also applicable. In a container-based architecture, for example, the applications are executed in special containers rather than virtual machines.

In some embodiments, instances of applications are configured to execute on the VMs. In some embodiments, a single application corresponds to a single virtual service. Examples of such virtual services include web applications such as shopping cart, user authentication, credit card authentication, email, file sharing, virtual desktops, voice/video streaming, online collaboration, and many others. In some embodiments, a set of applications is collectively referred to as a virtual service. For example, a web merchant can offer shopping cart, user authentication, credit card authentication, product recommendation, and a variety of other applications in a virtual service. Multiple instances of the same virtual service can be instantiated on different devices. For example, the same shopping virtual service can be instantiated on VM 118 and VM 120. The actual distribution of the virtual services depends on system configuration, run-time conditions, etc. Running multiple instances of the virtual service on separate VMs provides better reliability and more efficient use of system resources.

One or more service engines (e.g., 114, 124, etc.) are instantiated on a physical device. In some embodiments, a service engine is implemented as software executing in a virtual machine. The service engine provides distributed network services for applications executing on the same physical server as the service engine, and/or for applications executing on different physical servers. In some embodiments, the service engine is configured to enable appropriate service components. For example, a load balancer component is executed to provide load balancing logic to distribute traffic load amongst instances of applications executing on the local physical device as well as other physical devices; a firewall component is executed to provide firewall logic to instances of the applications on various devices; and a metrics agent component is executed to gather metrics associated with traffic, performance, etc. associated with the instances of the applications. Many other service components may be implemented and enabled as appropriate. When a specific service is desired, a corresponding service component is configured and invoked by the service engine to execute in a VM.

Traffic received on a physical port of a server (e.g., a communications interface such as Ethernet port) is sent to a virtual switch associated with an OS. In some embodiments, the virtual switch is configured to use an application programming interface (API) provided by the hypervisor to intercept incoming traffic designated for the application(s) in an inline mode, and send the traffic to an appropriate service engine. In inline mode, packets are forwarded on without being replicated. The virtual switch passes the traffic to a service engine in the distributed network service layer (e.g., the service engine on the same physical device), which transforms the packets if needed and redirects the packets to the appropriate application. The service engine, based on factors such as configured rules and operating conditions, redirects the traffic to an appropriate application executing in a VM on a server.

Controller 190 is configured to control, monitor, program, and/or provision the distributed network services and virtual machines. In particular, the controller includes a cloud connector 192 configured to communicate with the servers via the cloud layer 140. Cloud layer 140 can be implemented by shared pools of configurable computer system resources by various cloud service providers. Controller 190 interacts with the cloud layer via the cloud connector 192. The cloud connector may make API calls, send object requests, and batch and send tasks using the techniques further described below. In a conventional system, the cloud connector forms a single queue of calls, and the calls are carried out synchronously or in order. The calls are typically sent synchronously to avoid conflicts between calls and to maintain concurrency. Some calls to the cloud can take on the order of minutes to complete. Cloud providers often provide batching techniques to improve API call latencies. For example, in Azure®, if multiple IP addresses are being added to the same network interface controller (NIC), instead of issuing N different NIC operations, the IP addresses can be batched into a single "update NIC" call, which takes the same time as updating a single IP address on a NIC. In Google Cloud®, multiple HTTP requests can be sent as a single batch of requests, which reduces the HTTP connection overhead of each request. Each request is also executed in parallel. The task management and scheduling techniques described below determine how and which tasks to batch to reduce processing time. In one aspect, the techniques are cloud agnostic, meaning that they can be applied to a variety of cloud providers including, without limitation, Amazon AWS®, Google Cloud®, Microsoft Azure®, and VMWare®. In some embodiments, controller 190 is configured to interact with multiple clouds, e.g., when more than one type of cloud is used together.

The controller 190 can be implemented as software, hardware, firmware, or any combination thereof. In some embodiments, the controller is implemented on a system such as 300. In some cases, the controller is implemented as a single entity logically, but multiple instances of the controller are installed and executed on multiple physical devices to provide high availability and increased capacity. Correspondingly, cloud connector 192 can be installed and executed on multiple physical devices. In embodiments implementing multiple controllers, known techniques such as those used in distributed databases are applied to synchronize and maintain coherency of data among the controller instances.

In the example shown, a cloud layer 140 interfaces between controller 190 and the servers 102, 104, and 106. A control path is provided via a cloud API 132. A cloud connector 192 associated with the controller 190 is configured to communicate with each of the servers via a respective API 132. The servers may be of different types, and the API enables the cloud connector (and the controller more generally) to service requests, schedule tasks, and implement the other cloud agnostic task management techniques further described below. For example, controller 120 makes an API call to a VM 118 of server 102 using API 132. Referring to the earlier example in which a web merchant offers shopping cart, user authentication, credit card authentication, product recommendation, and a variety of other applications in a virtual service, the API call can be for processing a transaction with a credit card number to be handled by an app corresponding to VM 118.

The components and arrangement of distributed network service platform 104 described above are for purposes of illustration only. The technique described herein is applicable to network service platforms having different components and/or arrangements. For example, the cloud agnostic task scheduling techniques described below can be applied to a platform with a large number of servers (e.g., on the order of 500) with a few virtual services (e.g., on the order of 10) as well as a platform with a single server (or a small number of servers) with a large number of virtual services (e.g., on the order of 10,000).

The following figure shows a more detailed example of a cloud connector 192.

FIG. 2 is a block diagram illustrating an embodiment of a system for cloud agnostic task scheduling. The system 200 is an example of a cloud connector, which can be used to implemented cloud connector 192 of FIG. 1. The cloud connector can be implemented using software, hardware, firmware, or a combination thereof. Because it schedules tasks for a variety of clouds without needing to know the underlying cloud implementation details, the cloud connector is sometimes referred to here as a "cloud agnostic task scheduler." In some embodiments, the cloud connector includes one or more APIs used to integrate with cloud providers (cloud agent(s) 250) such as Amazon AWS®, Google Cloud®, Microsoft Azure®, VMWare®, and the like. The cloud providers may be remote from the controller. The APIs are used to make calls to the cloud to request actions to carry out tasks requested by a user interacting with the controller. The system includes a call handler 220, a scheduler 230, a task runner 240, cloud agent(s) 250, and a database notifier 260.

The call handler 220 is configured to handle calls such as remote procedure calls and RESTful API calls. Examples of API calls (requests) that tend to take more time and would especially benefit from the task management and scheduling techniques described here include: attach_ip, detach_ip, deconfigure_cloud, lookup_nw, update_vip, create_se, register_dns, deregister_dns, add_vnic, and the like. All calls being handled can be classified into either read requests or write requests. Requests that access data without modifying the data is classified as read requests, while other requests are classified as write requests. Cloud connector 200 is configured to listen on one queue for read calls and a separate queue for write calls. Read handler 222 is configured to handle read requests using conventional techniques such as processing the call and dropping it (removing it from a request queue). For example, a worker pool manages the order of requests forwards the requests to cloud agent(s) 250. Write handler 224 is configured to handle write calls, more specifically write requests that modify the cloud, by queueing the requests internally and processing the requests according to the process described below, which may be asynchronous processing. An example of a write request that modifies the cloud is "attach_ip," which attaches an IP address to a server, and "create_se," which creates a service engine.

The scheduler 230 is configured to determine whether a request can be processed, consolidate requests, generate tasks for each request, and send the tasks to the task runner 240 for execution. The scheduler may determine that a request can be processed based on various criteria. A request has an associated object ID identifying the object (e.g., a virtual or physical entity present in the cloud environment) on which the request operates. The object ID may be unique for a set of objects for a service provider. The object ID may be assigned at the time a request is created by checking which object the request operates on. If there are other pending tasks for the same object (e.g., as identified by its object ID), the scheduler determines that the request cannot be processed. This is because tasks on the same object changes the state of the object, which can cause conflict or concurrency issues if allowed to operate on the object out of order (or simultaneously). Therefore, if there is already at least one earlier task for an object, subsequent requests with tasks for the same object are not immediately executed and instead placed in a request queue for processing at a later time when the earlier task has completed.

In some embodiments, the scheduler consolidates requests that can be merged. For example, in some types of clouds, multiple attach_ip requests on a same NIC can be merged into a single attach_ip request for the NIC in Azure. In other words, multiple attach_ip requests are consolidated to derive the end state of the IP. Suppose a series of requests come to move (ip1→NIC1), (ip1→NIC2) (ip1→NIC3), the end state of IP1 should be on NIC3. These requests get merged into one request (ip1→NIC3). The consolidation of requests is cloud agnostic because the scheduler disregards the cloud agent/provider type when the scheduler is combining requests. In this sense, the request management (including task scheduling) is cloud agnostic and does not require specific knowledge of the cloud (e.g., how the cloud is implemented or the specific cloud provider) at this stage in the process.

After requests have been consolidated (if applicable) to reduce the number of requests, the scheduler generates tasks for each request or group (consolidated) of requests. Task generation is cloud-specific because tasks are specific to a cloud provider, so the scheduler calls a corresponding cloud agent of the cloud agent(s) 250 to generate tasks. For example, different cloud providers understand/are able to implement tasks specific to that cloud. The scheduler then queues the tasks to task runner 240. While they await processing, the requests can be managed by a worker pool in the scheduler. For example, the scheduler may maintain a pending requests queue for requests that have been forwarded to the task runner, and when the tasks associated with the pending request are completed, then the request is removed from the pending requests queue because they have been completed.

The task runner 240 processes tasks received from the scheduler by merging/batching them into fewer tasks, executing each batch of tasks concurrently, and notifying the scheduler when the task execution is complete. The task runner considers the dependencies of the tasks and executes the tasks based on the dependencies. A dependency between two tasks is a relationships in which one task should be performed before another task. Similar to request consolidation, which reduces the number of requests, the task runner batches tasks to reduce the number of operations sent to the cloud. The task runner may batch tasks differently depending on the cloud destination. For example, in Microsoft Azure®, multiple operations on a single object and be batched into a single object and sent to the cloud. In Google Cloud®, a batch HTTP request can be made as a single request to the cloud. The cloud agent 250 completes the tasks and operations and notifies the task runner. The task runner then sends the next set of tasks, if any. Upon completion of all tasks associated with a request, the task runner notifies the scheduler. The scheduler removes the request from its pending requests queue to indicate that the request has been processed. While they await processing, the tasks can be managed by a worker pool in the scheduler.

System 200 optionally includes a database notifier 260, which is configured to reconfigure cloud agents. For example, the database notifier 260 may push updated configurations to cloud agents.

In operation, call handler 220 receives a call, determines whether the call is a read request or a write request, and forwards it to the appropriate handler (read handler 222 for reads and write handler 224 for writes). In the example of FIG. 2, there are four write requests (Request 1 to Request 4) that get forwarded to write handler 224. These requests are sent by the write handler to the scheduler 230. The scheduler determines that Requests 1, 3, and 4 can be processed but not Request 2. Each request has an associated object on which the request operates. The object being operated on is identified by an objectID. For example, the scheduler determines that Request 2 cannot be processed at the current time because there are other pending tasks for the objectID associated with Request 2. Request 2 is placed in a queue and not executed, as indicated by "[Request 2]" in the figure.

For the requests that can be processed (here, Requests 1, 3, and 4), the scheduler consolidates requests that can be merged. For example, a first configuration request (Request 1) and then a second configuration request (Request 3) are received. The first configuration second configuration request can be combined (e.g., because there are no concurrency issues and no conflicts in the objects they operate on). Thus, the first and second configuration requests are combined. The decision of whether requests can be merged can be based on whether they operate on the same object, as further described below. Here, Request 1 cannot be merged with any other requests, and is labeled "Request I" to indicate the state of the request after the merge/consolidation has been performed. Requests 3 and 4 can be merged into a combined request "Request II." The scheduler generates tasks for Request I and Request II by determining one or more tasks that can be executed to carry out the request. Here, there are two tasks, Task A and B, associated with Request I and three tasks, Task C, D, and E associated with Request II. These tasks are sent to the task runner 240.

The task runner 240 merges Tasks A and B into a single task, Task a; Tasks C and D into Task b; and since Task E is not mergeable in this example, it is labeled "Task c." The decision of whether tasks can be merged can be based on whether they operate on the same object or other pending tasks, as further described below. In other words, three tasks are generated from the original five tasks in the merging/consolidation process. These three tasks are sent to cloud agent(s) 250 for execution. When the cloud agent(s) notify the task runner that the tasks are complete, the task runner notifies scheduler to indicate that the request is complete. The scheduler can then check the request queue to see if Request 2 can now be processed.

The cloud connector can be implemented by a programmed computer system such as the one shown in the following figure.

Figure 3:
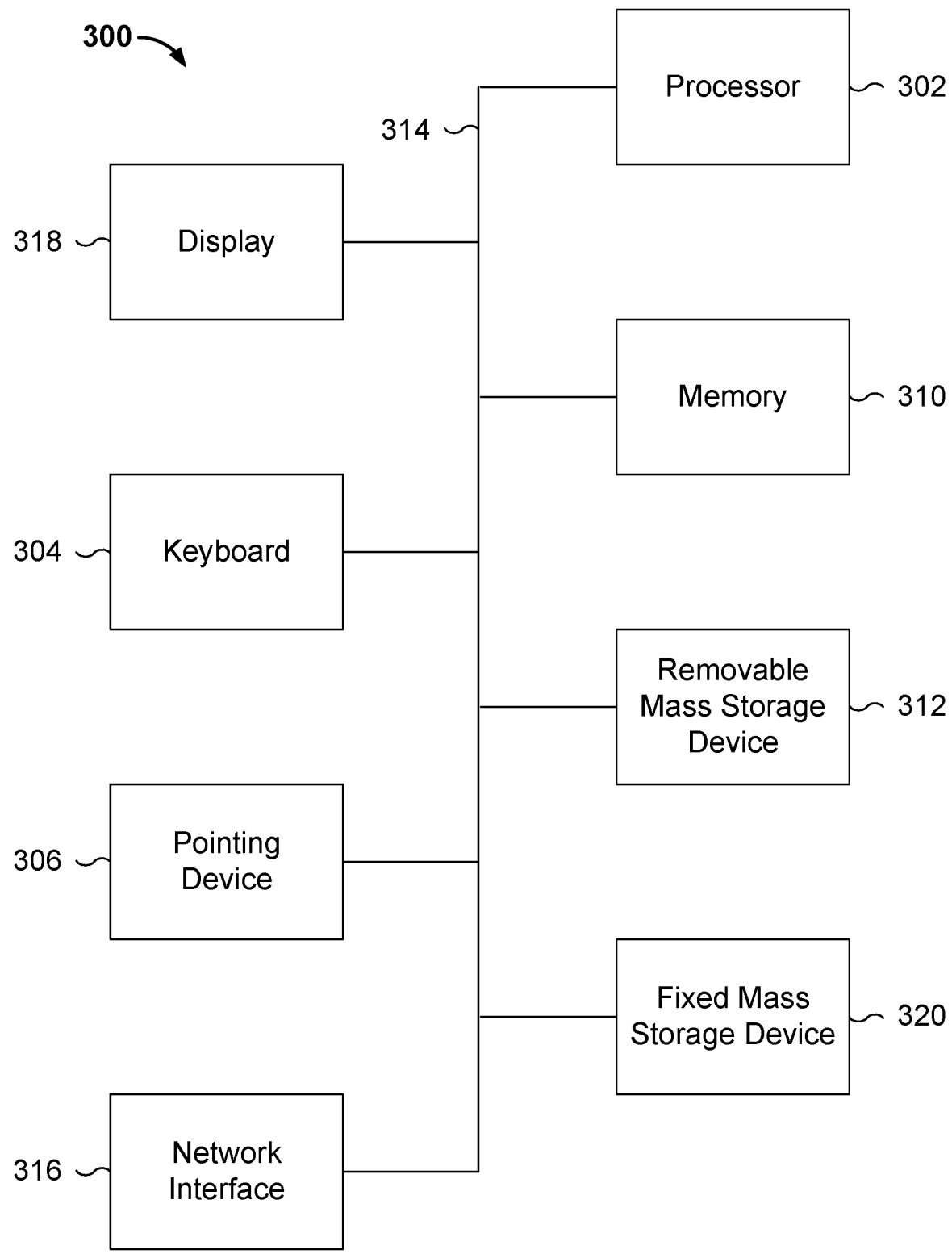
FIG. 3 is a functional diagram illustrating a programmed computer system for cloud agnostic task scheduling in accordance with some embodiments.

FIG. 3 is a functional diagram illustrating a programmed computer system for cloud agnostic task scheduling in accordance with some embodiments. As will be apparent, other computer system architectures and configurations can be used to perform the described task scheduling technique. Computer system 300, which includes various subsystems as described below, includes at least one microprocessor subsystem (also referred to as a processor or a central processing unit (CPU) 302). For example, processor 302 can be implemented by a single-chip processor or by multiple processors. In some embodiments, processor 302 is a general purpose digital processor that controls the operation of the computer system 300. In some embodiments, processor 302 also includes one or more coprocessors or special purpose processors (e.g., a graphics processor, a network processor, etc.). Using instructions retrieved from memory 310, processor 302 controls the reception and manipulation of input data received on an input device (e.g., image processing device 306, I/O device interface 304), and the output and display of data on output devices (e.g., display 318).

Processor 302 is coupled bi-directionally with memory 310, which can include, for example, one or more random access memories (RAM) and/or one or more read-only memories (ROM). As is well known in the art, memory 310 can be used as a general storage area, a temporary (e.g., scratch pad) memory, and/or a cache memory. Memory 310 can also be used to store input data and processed data, as well as to store programming instructions and data, in the form of data objects and text objects, in addition to other data and instructions for processes operating on processor 302. Also as is well known in the art, memory 310 typically includes basic operating instructions, program code, data, and objects used by the processor 302 to perform its functions (e.g., programmed instructions). For example, memory 310 can include any suitable computer readable storage media described below, depending on whether, for example, data access needs to be bi-directional or uni-directional. For example, processor 302 can also directly and very rapidly retrieve and store frequently needed data in a cache memory included in memory 310.

A removable mass storage device 312 provides additional data storage capacity for the computer system 300, and is optionally coupled either bi-directionally (read/write) or uni-directionally (read only) to processor 302. A fixed mass storage 320 can also, for example, provide additional data storage capacity. For example, storage devices 312 and/or 320 can include computer readable media such as magnetic tape, flash memory, PC-CARDS, portable mass storage devices such as hard drives (e.g., magnetic, optical, or solid state drives), holographic storage devices, and other storage devices. Mass storages 312 and/or 320 generally store additional programming instructions, data, and the like that typically are not in active use by the processor 302. It will be appreciated that the information retained within mass storages 312 and 320 can be incorporated, if needed, in standard fashion as part of memory 310 (e.g., RAM) as virtual memory.

In addition to providing processor 302 access to storage subsystems, bus 314 can be used to provide access to other subsystems and devices as well. As shown, these can include a display 318, a network interface 316, an input/output (I/O) device interface 304, an image processing device 306, as well as other subsystems and devices. For example, image processing device 306 can include a camera, a scanner, etc.; I/O device interface 304 can include a device interface for interacting with a touchscreen (e.g., a capacitive touch sensitive screen that supports gesture interpretation), a microphone, a sound card, a speaker, a keyboard, a pointing device (e.g., a mouse, a stylus, a human finger), a Global Positioning System (GPS) receiver, an accelerometer, and/or any other appropriate device interface for interacting with system 300. Multiple I/O device interfaces can be used in conjunction with computer system 300. The I/O device interface can include general and customized interfaces that allow the processor 302 to send and, more typically, receive data from other devices such as keyboards, pointing devices, microphones, touchscreens, transducer card readers, tape readers, voice or handwriting recognizers, biometrics readers, cameras, portable mass storage devices, and other computers.

The network interface 316 allows processor 302 to be coupled to another computer, computer network, or telecommunications network using a network connection as shown. For example, through the network interface 316, the processor 302 can receive information (e.g., data objects or program instructions) from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 302 can be used to connect the computer system 300 to an external network and transfer data according to standard protocols. For example, various process embodiments disclosed herein can be executed on processor 302, or can be performed across a network such as the Internet, intranet networks, or local area networks, in conjunction with a remote processor that shares a portion of the processing. Additional mass storage devices (not shown) can also be connected to processor 302 through network interface 316.

In addition, various embodiments disclosed herein further relate to computer storage products with a computer readable medium that includes program code for performing various computer-implemented operations. The computer readable medium includes any data storage device that can store data which can thereafter be read by a computer system. Examples of computer readable media include, but are not limited to: magnetic media such as disks and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code as produced, for example, by a compiler, or files containing higher level code (e.g., script) that can be executed using an interpreter.

The computer system shown in FIG. 3 is but an example of a computer system suitable for use with the various embodiments disclosed herein. Other computer systems suitable for such use can include additional or fewer subsystems. In some computer systems, subsystems can share components (e.g., for touchscreen-based devices such as smart phones, tablets, etc., I/O device interface 304 and display 318 share the touch sensitive screen component, which both detects user inputs and displays outputs to the user). In addition, bus 314 is illustrative of any interconnection scheme serving to link the subsystems. Other computer architectures having different configurations of subsystems can also be utilized.

FIG. 4 is a flow chart illustrating an embodiment of a process for cloud agnostic task scheduling. This process may be implemented by controller 190, or more specifically, by cloud connector 192. The process of FIG. 4 will be explained using the example of setting up and accessing a web server for web commerce. The example is not intended to be limiting, and the process can be applied to a variety of other applications.

In the example shown, the process begins by receiving a configuration request for a configuring a virtual service in a cloud environment (402). A cloud environment is a system in which computing resources such as CPUs and memory are shared, applications run on VMs and the architecture is opaque to a controller in the environment. For example, the controller receives and responds to requests without needing to know the underlying architecture of the system. An example of a cloud environment is shown in FIG. 1. The configuration request can be an API call to create or modify an object in a cloud. For example, creating a web server involves requesting the web server to be set up as a virtual service.

In response to a pre-specified event, one or more objects that are operated on by the configuration request are identified (404). As explained above, requests include an ID of the object(s) the requests operate on. Objects operated on by the configuration request can be identified by looking up objectIDs to determine what object is operated on. The pre-specified event includes a triggering event such as completion of processing of at least one request or receiving a new request. Returning to the example described in FIG. 2 in which request R2 is placed in a queue while requests R1, R3, and R4 are processed, a pre-specified event would be when requests R1, R3, and R4 have been executed, which triggers the lookup of objects that request R2 is operating on.

Returning to FIG. 4, a list of pending tasks is checked to determine if the request can be processed (406). In other words, it is determined that a request can be processed based at least in part on the list of pending tasks. Whether the request can be processed depends on one or more concurrency restraints (e.g., restraints on the order of operations), for example. In some embodiments, the list of pending tasks includes tasks to be executed from one or more previous requests. In some embodiments, the process determines that the request cannot be processed if there are existing tasks operating on a same object. As explained above, one reason why a task operating on an object that is already being operated on by another task is not executed is that the tasks may be conflicting (e.g., when a read task is currently executing while a write task is pending), causing the object to end up in a state that is not consistent with performing the tasks in order. If the request cannot be processed, the process terminates. Otherwise, if the request can be processed, the process proceeds to 408.

In response to the determination that the request can be processed, one or more end states for the one or more objects that are identified is derived (408). In some embodiments, the derivation is made by determine the end state of an object if all pending tasks are applied to the object. For example, if there are multiple writes on an object, the end state would be the result after all of the writes have been executed. The end state can be determined by simulating execution of the pending tasks or determining the result of each pending task in the sequence of the pending tasks. Knowing the end state can eliminate some of the pending tasks because they ultimately do not affect the end state, which reduces the number of processing cycles used because fewer tasks can be executed to reach the same end state.

The request is converted to a set of one or more tasks operating on the one or more objects (410). This may include combining tasks to reduce the number of tasks operating on the objects to bring about the end state determined at 408. In some embodiments, the conversion of the tasks is performed prior to deriving end state(s) in 408.

The set of one or more tasks is added to the list of pending tasks (412). This updates the pending tasks to reflect tasks associated with a current request.

Tasks in the list of pending tasks that are combinable are identified (414). Tasks that can be combined are those that operate on the same object. For example, tasks with the same object ID are combined. Suppose a web server has been set up, and now various IP addresses are being attached to a NIC associated with the web server. When adding an IP address to a NIC, the tasks can be attach_IP(IPaddr2, NIC1) and attach_IP(IPaddr3, NIC1), which respectively means that IP address 2 is attached to NIC 1 and IP address 3 is attached to NIC 1. Applying these two tasks results in both IP address 2 and IP address 3 being attached to NIC 1. Some clouds support a single task combining the two tasks: attach_IP (IPaddr2 and IPaddr3, NIC1).

The identified tasks are combined into a combined task that would result in the one or more end states (416). The execution of a combined task results in one or more ends states of the object that is equivalent to executing multiple tasks.

The combined task is sent to be executed (418). For example, the tasks is sent to one or more cloud agents 250. The process of FIG. 4 will now be described using the example of the five requests in FIG. 5.

FIG. 5 shows an example of request processing by a cloud agnostic task scheduler according to some embodiments. In this example, five requests (Request R1 through Request R5) are processed using the process of FIG. 4. Each of the requests includes sub-tasks (tasks T6 and T7 correspond to request R1, tasks T8 and T9 correspond to request R2, and so on), although these sub-tasks are not necessarily known until the request has been processed. Earlier requests (associated tasks are T3, T4, and T5) are executing when these five requests are received.

The timeline shows an example of the sequence and timing by which the requests are received. Also shown are a task execution queue and a request queue corresponding to each time (1-6) in the timeline. At time 1, request R1 arrives. This means that R1 is received by cloud connector 192 in the manner of 402. Since this is the receipt of a new request (which is a type of pre-specified event that triggers object identification 404), objects operated on by request R1 are identified. In this example, request R1 operates on objectID 3 and NIC 1, as do the other requests.

A list of pending tasks is checked to determine if request R1 can be processed (406). In this example, at time 1, the pending tasks in the task execution queue are tasks T3, T4, and T5. Suppose that none of these pending tasks operate on objectID 3. This means that R1 can be processed, so R1 is added to the Request Queue and an end state for objectID 3 is derived (408). This corresponds to time 2. Here, the end state is the result of adding IP address IP1 to NIC 1. Request R1 is converted to a set of tasks operating on objectID 3 (410). Here, the tasks are task T6 (parameter configuration) and T7 (add IP1 to NIC 1). The set of tasks (T6 and T7) are added to the list of pending tasks. Here, the Task Execution Queue at time T3 shows that T6 and T7 have been added to the queue (in the meantime, tasks T3, T4, and T5 had completed execution so they are no longer in the queue). This corresponds to time 3.

At time 4, four more requests R2-R5 arrive. They may arrive simultaneously or sequentially. For the purposes of this example, these are requests that arrive (in any order) while tasks T6 and T7 are executing. Requests R2-R5 all operate on objectID 3, thus they cannot be processed because R1, which is being executed, operates on the same objectID (406). Requests R2-R5 are placed in the Request Queue to be taken up later when they are able to be executed.

At time 5, the tasks associated with request R1 complete executing, which is reflected by the empty Task Execution Queue. The completion of a request execution is an example of a pre-specified event that causes objects to be identified (404). In response to the pre-specific event, R2-R5 can be executed because there is no conflict with any objects that are currently being operated on. Each of requests R2-R5 is converted to a set of tasks. Example tasks as shown in FIG. 5: R2 corresponds to adding IP2 to NIC1, R3 corresponds to removing IP1 from NIC1, R4 corresponds to removing IP2 from NIC1, and R5 corresponds to deleting NIC1. Those tasks that can be combined are identified (414). As described above, combinability can be depend on the type of cloud agent to which the task is ultimately sent. For example, tasks T9, T11, T13, and T15 can be combined in some cloud implementations because they all concern operations on a particular NIC. More specifically, the end state after tasks T9, T11, T13, and T15 have all completed is that NIC1 is deleted. This means that only T15 can be executed and the intermediate modifications of NIC1 need not be executed. For example, the system simulates the execution of these tasks to determine an end state, where the end state corresponds to executing T15 alone without needing to execute intermediate tasks. Thus, the combined task (here, T15) is sent to the cloud to be executed (418).

The cloud agnostic task scheduling techniques described here have many advantages over conventional task scheduling. In one aspect, processing time is reduced, meaning that fewer processing cycles are required to service requests. Instead of needing to carry out requests one by one in the order they are received, requests can be deferred for processing, combined, converted to tasks (the tasks can also be merged resulting in fewer tasks for execution), and sent to the cloud for execution. In another aspect, less memory resources are used. The techniques described above were tested using a batch of 95 virtual services with 8 virtual service creations happening in parallel. When comparing the techniques disclosed here and conventional techniques, the minimum time taken to create a virtual service decreased by 68.75%, the maximum time taken to create virtual service decreased by 77.65%, and the average time taken to create a virtual service decreased by 82.25%. In yet another aspect, the techniques described here can be applied to many types of cloud providers without needing to know the exact cloud implementation details.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for reducing time to configure a resource of a virtual service deployed in a public cloud, the method comprising:
   receiving a plurality of distinct configuration requests for configuring the resource of the virtual service deployed in the public cloud;
   queueing the received plurality of configuration requests, based on a determination that the requests cannot be currently processed as at least one prior request has been sent to a set of cloud servers and is being processed by the cloud server set to configure the resource;

after the prior request has been processed, generating a combined request by combining the queued plurality of requests; and sending the combined request to the cloud server set to execute to configure the resource to have an end state associated with execution of the plurality of distinct configuration requests on the resource.

2. The method of claim 1, wherein a configuration request includes an application programming interface (API) call to create or modify the resource of the virtual service.

3. The method of claim 1, wherein generating the combined request results in fewer messages to the cloud server set than sending the plurality of configuration requests individually.

4. The method of claim 1, wherein generating the combined request comprises determining that the plurality of requests can be combined.

5. The method of claim 4, wherein each request in the plurality of requests is associated with a set of tasks to be executed by the cloud server set, and generating the combined request comprises generating at least one new task to replace at least two tasks of at least two requests in the plurality of requests.

6. The method of claim 5, wherein generating the combined request further comprises determining that at least two requests in the plurality of requests are combinable because the two requests comprise at least two tasks that are combinable.

7. The method of claim 6, wherein generating the combined request further comprises:

identifying the end state of the resource of the virtual service that would result from executing tasks associated with the plurality of requests; and generating the combined task such that executing the combined task results in the end state of the resource of the virtual service.

8. The method of claim 5, wherein the tasks operate on a network interface card (NIC) of the virtual resource.

9. The method of claim 6, wherein determining that the tasks are combinable comprises communicating with the cloud server set to determine whether the tasks can be combined.

10. The method of claim 5, wherein combining the identified tasks into a combined task includes requesting a cloud provider to combine the identified tasks.

11. A system for reducing time to configure a resource of a virtual service in a cloud environment, the system comprising:

a non-transitory machine readable medium storing a program for reducing the time to configure a resource of a virtual service in a public cloud, the program for execution by a set of processing units, the program comprising a set of instructions for:

receiving a first request for configuring the resource of the virtual service in the public cloud;

determining whether the first request cannot be processed based on at least one prior second request that is being processed for the virtual service;

when the first request can be processed, sending the first request to a set of cloud servers to execute to configure the resource of the virtual service;

when the first request cannot be processed, queueing the first request; and generating a combined request by combining the first request with a third request that was previously queued for the virtual service based on a determination that the third requests could not be processed due to the processing of the prior second request; and sending the combined request to the cloud server set to execute to configure the resource of the virtual service.

12. The system of claim 11, wherein a configuration request includes an application programming interface (API) call to create or modify the resource of the virtual service.

13. The system of claim 11, wherein the set of instructions for generating the combined request comprises sets of instructions for:

converting the first and third requests to a plurality of tasks to be executed by the cloud server set; and generating at least one new task to replace at least two tasks in the plurality of tasks.

14. The system of claim 13, wherein the set of instructions for generating the combined request further comprises a set of instructions for determining that the first and third requests are combinable because the first and third requests comprise at least two tasks that are combinable.

15. The system of claim 13, wherein generating the combined request further comprises:

identifying the end state of the resource of the virtual service that would result from executing the plurality of tasks; and generating the new task such that executing the new task results in the end state of the resource of the virtual service.

16. A non-transitory machine readable medium storing a program for reducing time to configure a resource of a virtual service in a public cloud, the program for execution by a set of processing units, the program comprising a set of instructions for:

receiving a first request for configuring the resource of the virtual service in the public cloud;

determining whether the first request cannot be processed based on at least one prior second request that is being processed for the virtual service;

when the first request can be processed, sending the first request to a set of cloud servers to execute to configure the resource of the virtual service in the public cloud;

when the first request cannot be processed, queueing the first request; and generating a combined request by combining the first request with a third request that was previously queued for the virtual service based on a determination that the third requests could not be processed due to the processing of the prior second request; and sending the combined request to the cloud server set to execute to configure the resource of the virtual service.

17. The non-transitory machine readable medium of claim 16, wherein a configuration request includes an application programming interface (API) call to create or modify the resource of the virtual service.

18. The non-transitory machine readable medium of claim 16, wherein the set of instructions for generating the combined request comprises sets of instructions for:

converting the first and third requests to a plurality of tasks to be executed by the cloud server set; and generating at least one new task to replace at least two tasks in the plurality of tasks.

19. The non-transitory machine readable medium of claim 16, wherein combining the tasks comprises:

identifying the end state of the resource of the virtual service that would result from executing the plurality of tasks; and generating the new task such that executing the new task results in the end state of the resource of the virtual service.

20. The non-transitory machine readable medium of claim 18, wherein the set of instructions for generating the combined request further comprises a set of instructions for determining that the first and third requests are combinable because the first and third requests comprise at least two tasks that are combinable.

* * * * *